(12) United States Patent  
Kiezulas et al.

(10) Patent No.: US 9,366,348 B2  
(45) Date of Patent: Jun. 14, 2016

(54) PRESSURE RELIEF VALVE

(75) Inventors: John Kiezulas, Andover, MA (US);  
James T. Roberts, Amherst, NH (US)

(73) Assignee: TRW Automotive US LLC, Livonia, MI (US)

( * ) Notice: Subject to any disclaimer, the term of this patent is extended or adjusted under 35 U.S.C. 154(b) by 1128 days.

(21) Appl. No.: 13/121,193

(22) PCT Filed: Sep. 30, 2009

(86) PCT No.: PCT/US2009/058918  
§ 371 (c)(1),  
(2), (4) Date: Mar. 28, 2011

(87) PCT Pub. No.: WO2010/039758  
PCT Pub. Date: Apr. 8, 2010

(65) Prior Publication Data  
US 2011/0175000 A1  Jul. 21, 2011

Related U.S. Application Data

(60) Provisional application No. 61/101,451, filed on Sep. 30, 2008.

(51) Int. Cl.  
*F16K 17/02* (2006.01)  
*B60H 1/24* (2006.01)  
*F16K 31/08* (2006.01)

(52) U.S. Cl.  
CPC .............. *F16K 17/02* (2013.01); *B60H 1/249* (2013.01); *F16K 31/084* (2013.01); *Y10T 29/49412* (2015.01)

(58) Field of Classification Search  
CPC ....... F16K 17/02; F16K 31/084; B60H 1/249; Y10T 29/49412

USPC .................. 251/65, 299, 300; 137/511, 527, 137/624.27, 315.33, 529, 527.1, 527.4; 29/890.124, 890.132, 890.127, 890.12, 29/527.1, 890.126, 527.4

See application file for complete search history.

(56) References Cited

U.S. PATENT DOCUMENTS

| 2,739,521 | A | * | 3/1956 | Spear ............................ 454/349 |
| 3,289,693 | A | * | 12/1966 | Scaramucci ................... 137/858 |
| 3,528,453 | A | * | 9/1970 | Dunkelis ...................... 137/527.8 |
| 3,541,945 | A | * | 11/1970 | Wexler .......................... 454/359 |
| 5,140,748 | A | * | 8/1992 | Kandpal ...................... 29/890.13 |

(Continued)

FOREIGN PATENT DOCUMENTS

| JP | 4183632 | 6/1992 |
| JP | 7276976 | 7/1995 |

(Continued)

*Primary Examiner* — John K Fristoe, Jr.  
*Assistant Examiner* — Andrew J Rost  
(74) *Attorney, Agent, or Firm* — Tarolli, Sundheim, Covell & Tummino LLP

(57) ABSTRACT

A pressure relief valve (10) includes a housing (12) that has a side wall (18) that defines an air flow passage (24). A valve element (14) has a closed condition that prevents air flow through the air flow passage (24) and an open condition that permits air flow through the air flow passage (24). A first insert (120) is connected to the valve element (14). A second insert (130) is connected to the side wall (18). The first insert (120) and the second insert (130) cooperate using magnetic forces to urge the valve element (14) to the closed condition. At least one of the first insert (120) and the second insert (130) is positioned within the air flow passage (24).

7 Claims, 11 Drawing Sheets

(56) References Cited

U.S. PATENT DOCUMENTS

| | | | |
|---|---|---|---|
| 5,716,271 A * | 2/1998 | Paidosh | 454/359 |
| 6,210,266 B1 * | 4/2001 | Barton | B29C 45/1676 137/855 |
| 7,390,978 B2 * | 6/2008 | Dean et al. | 174/521 |
| 2008/0047610 A1 * | 2/2008 | Denike et al. | 137/115.25 |

FOREIGN PATENT DOCUMENTS

| | | |
|---|---|---|
| KR | 19920007053 | 1/1992 |
| KR | 19990015713 | 5/1999 |
| KR | 100383744 | 3/2001 |

* cited by examiner

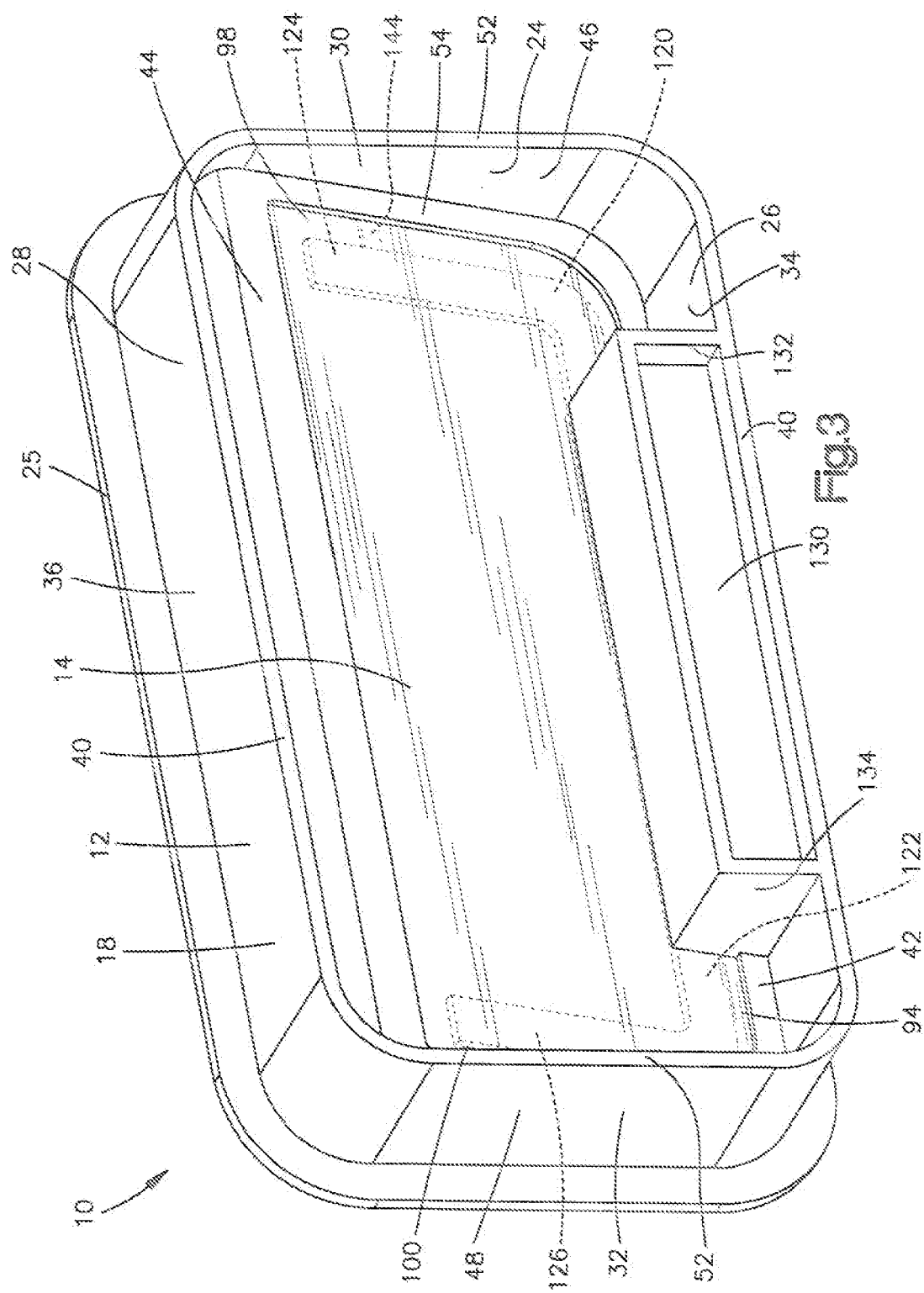

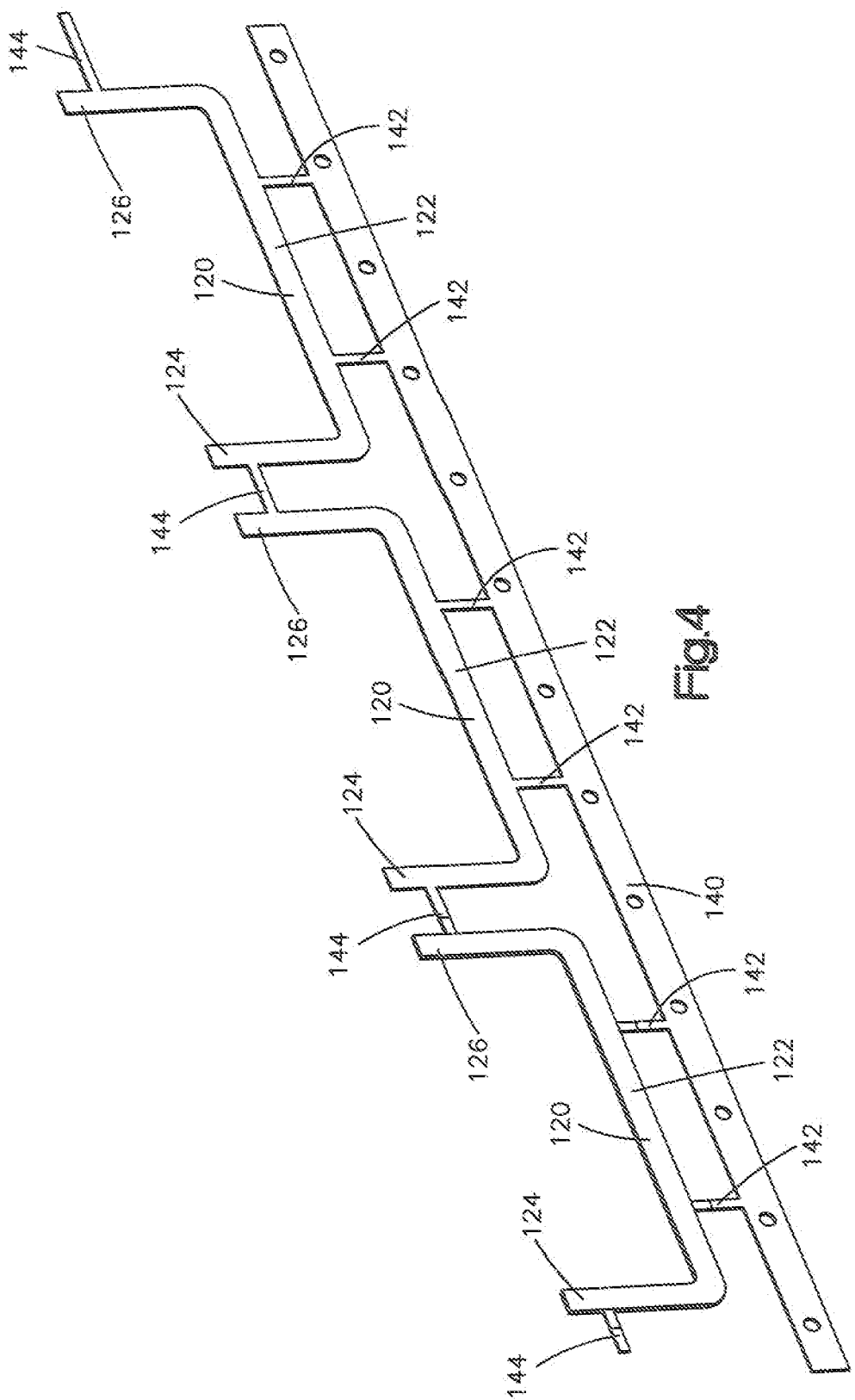

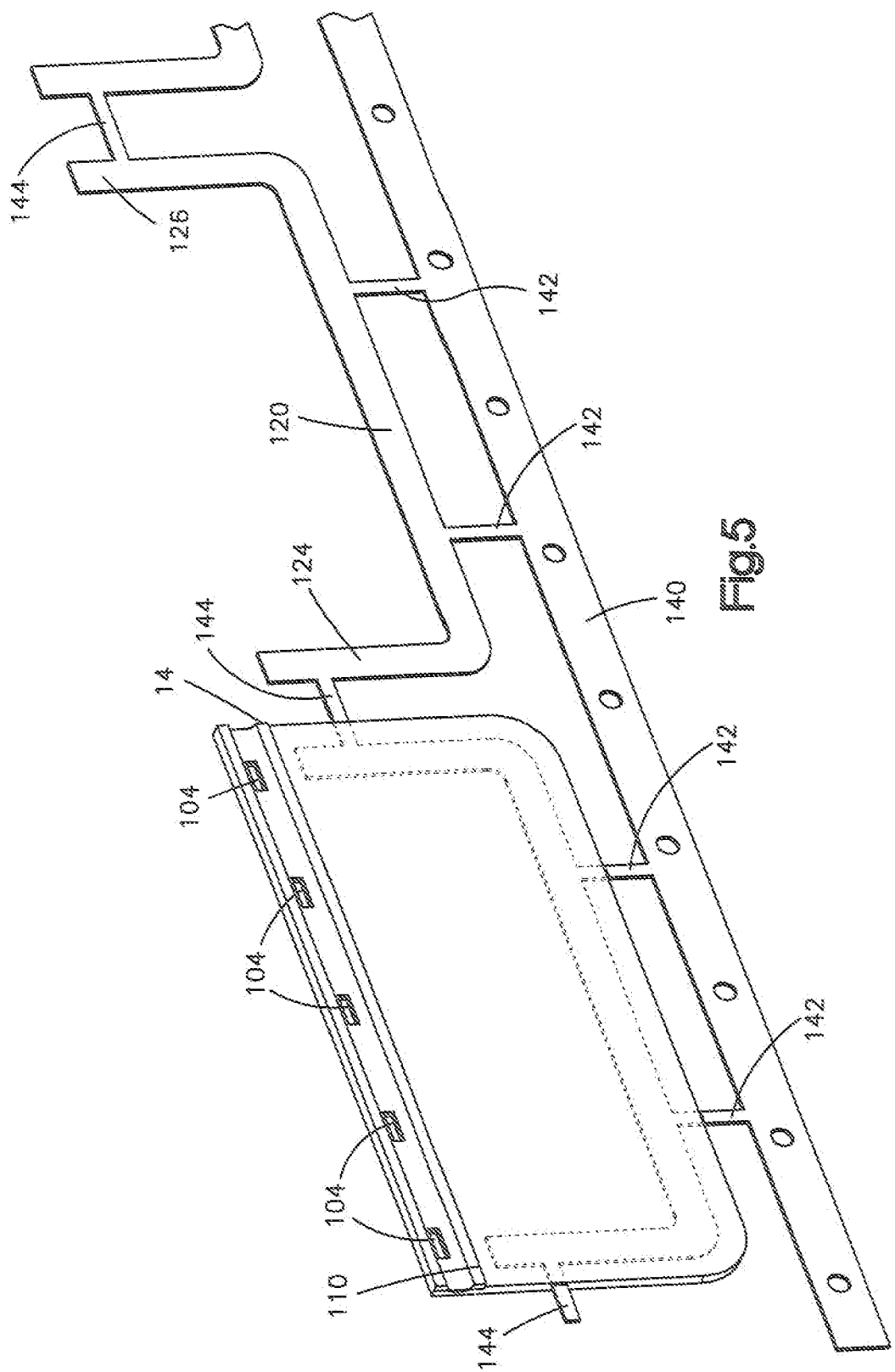

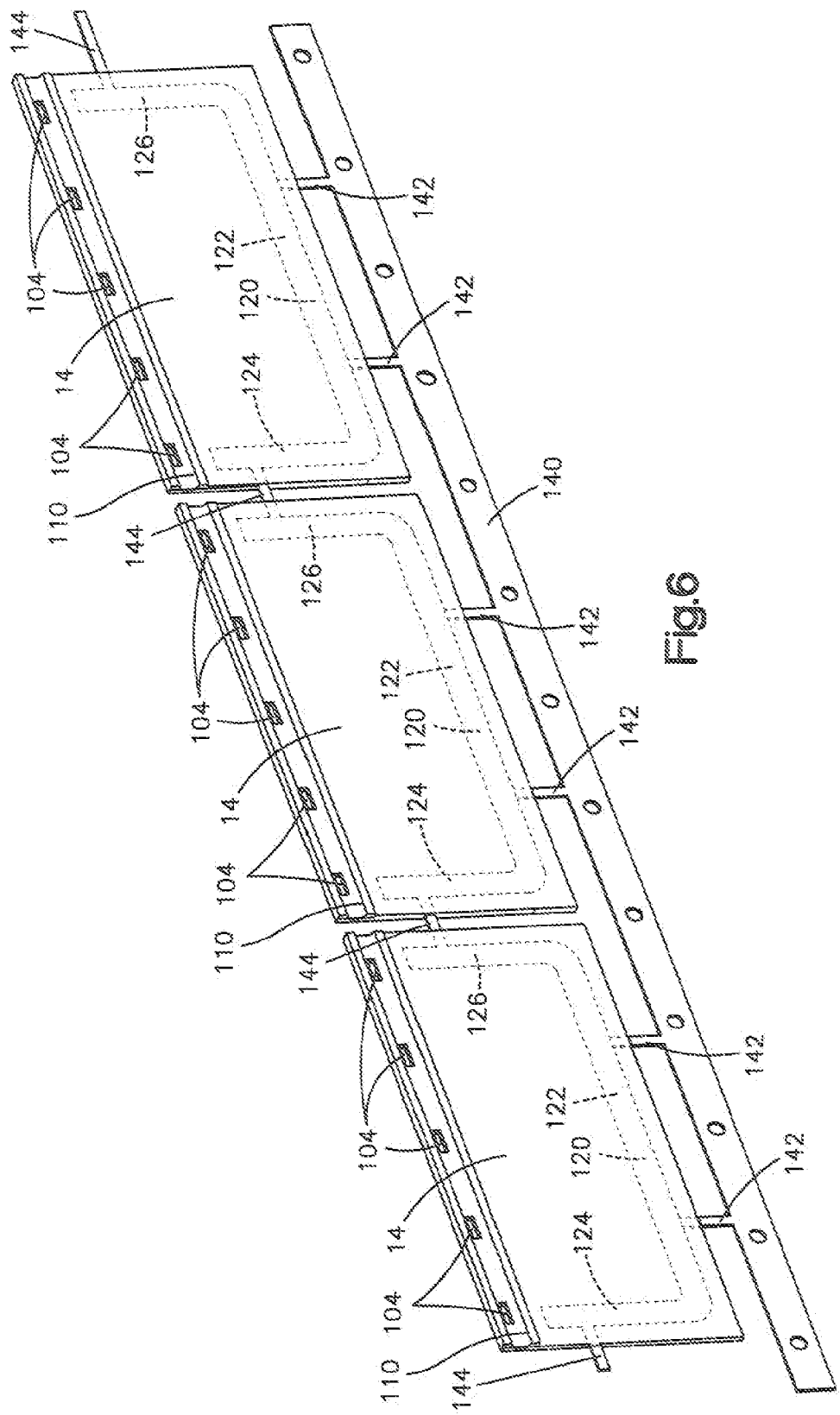

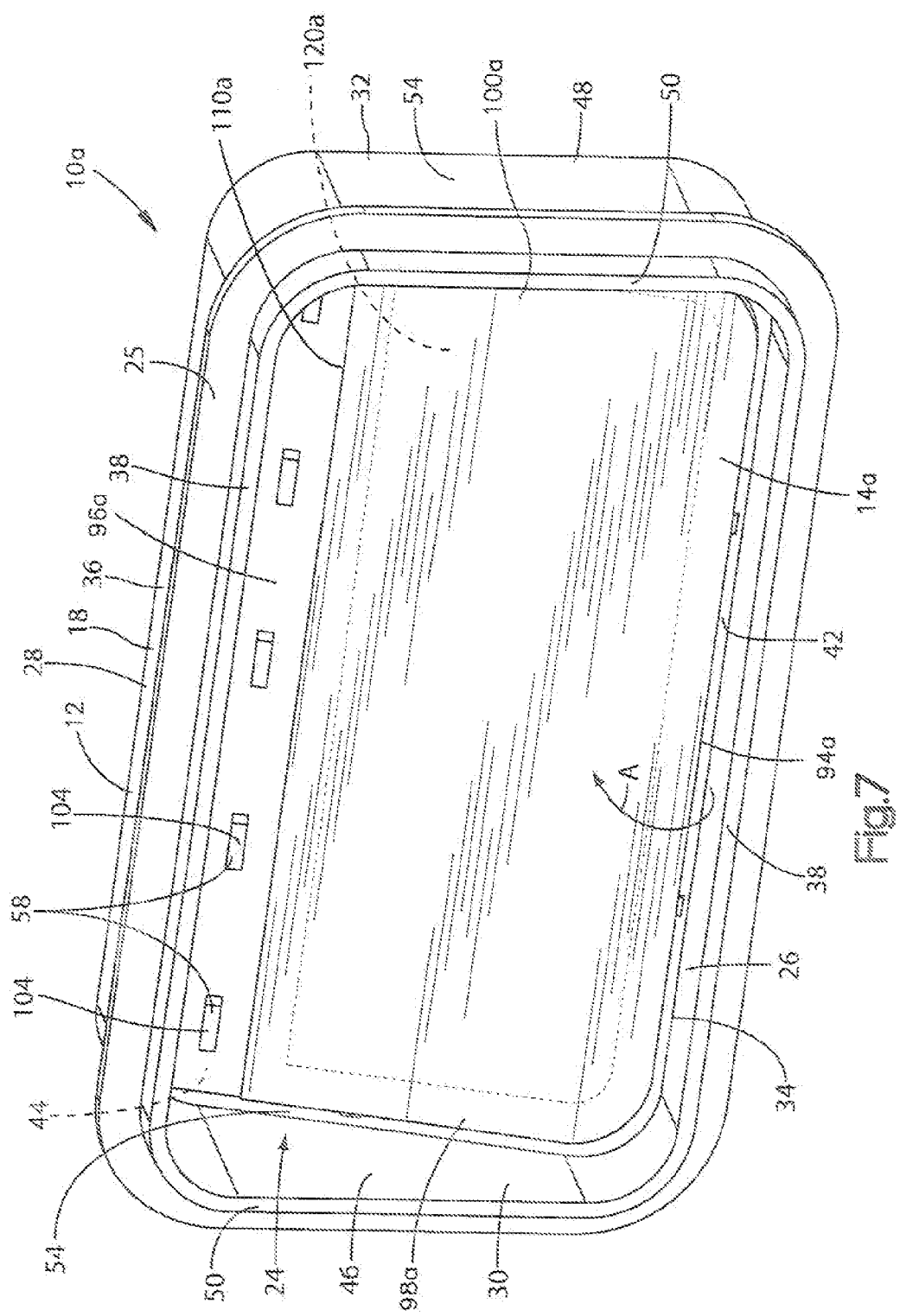

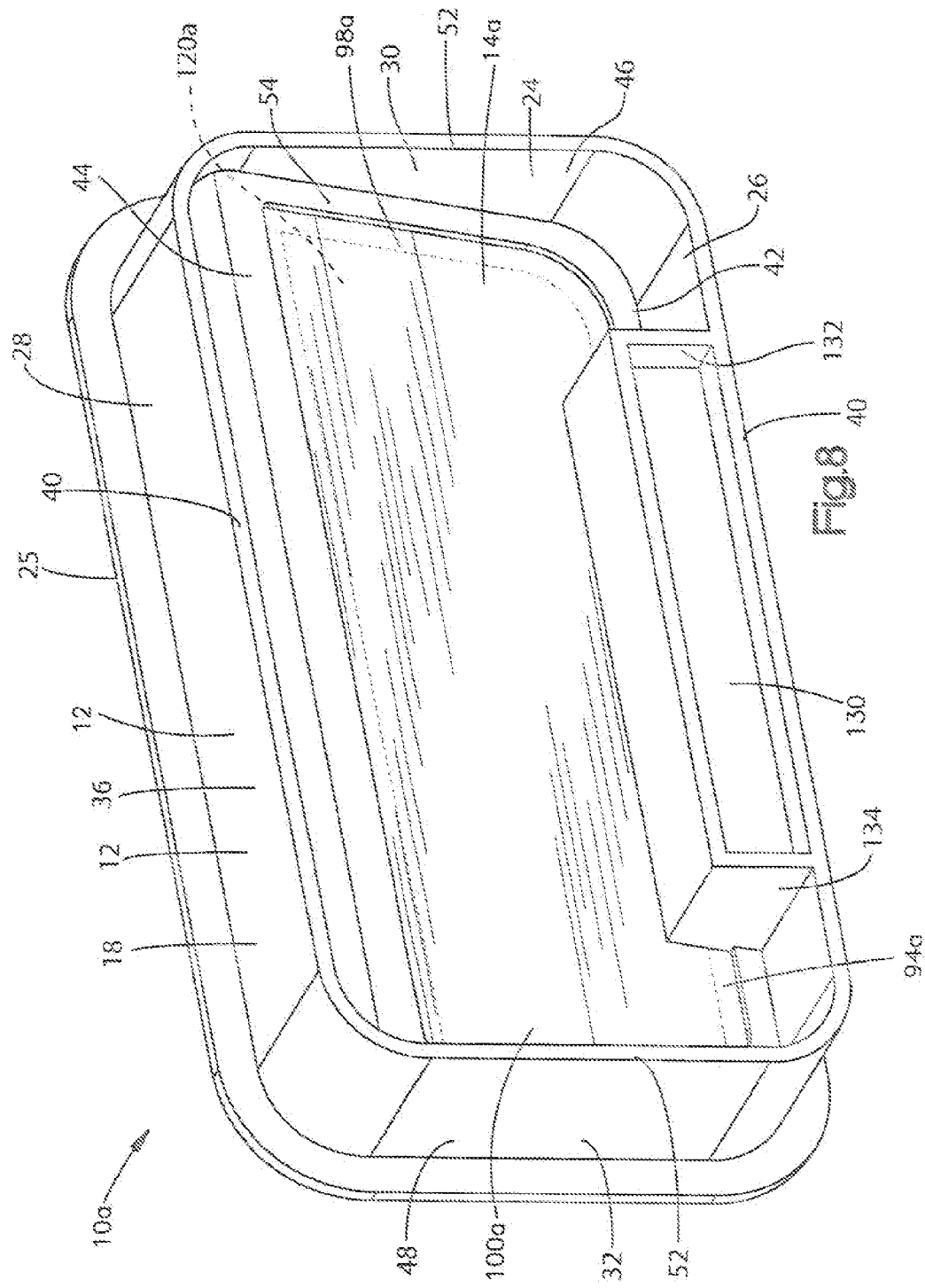

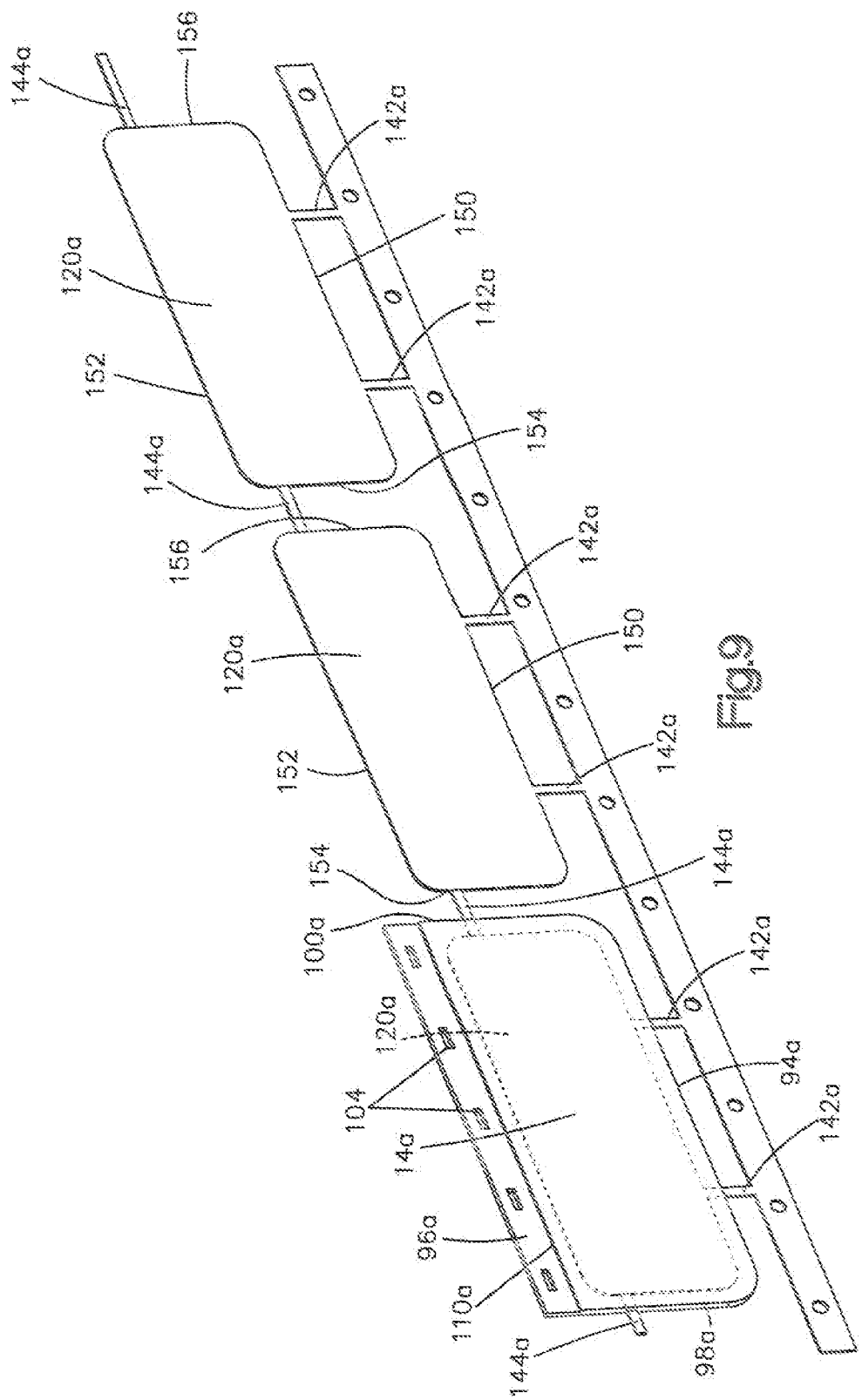

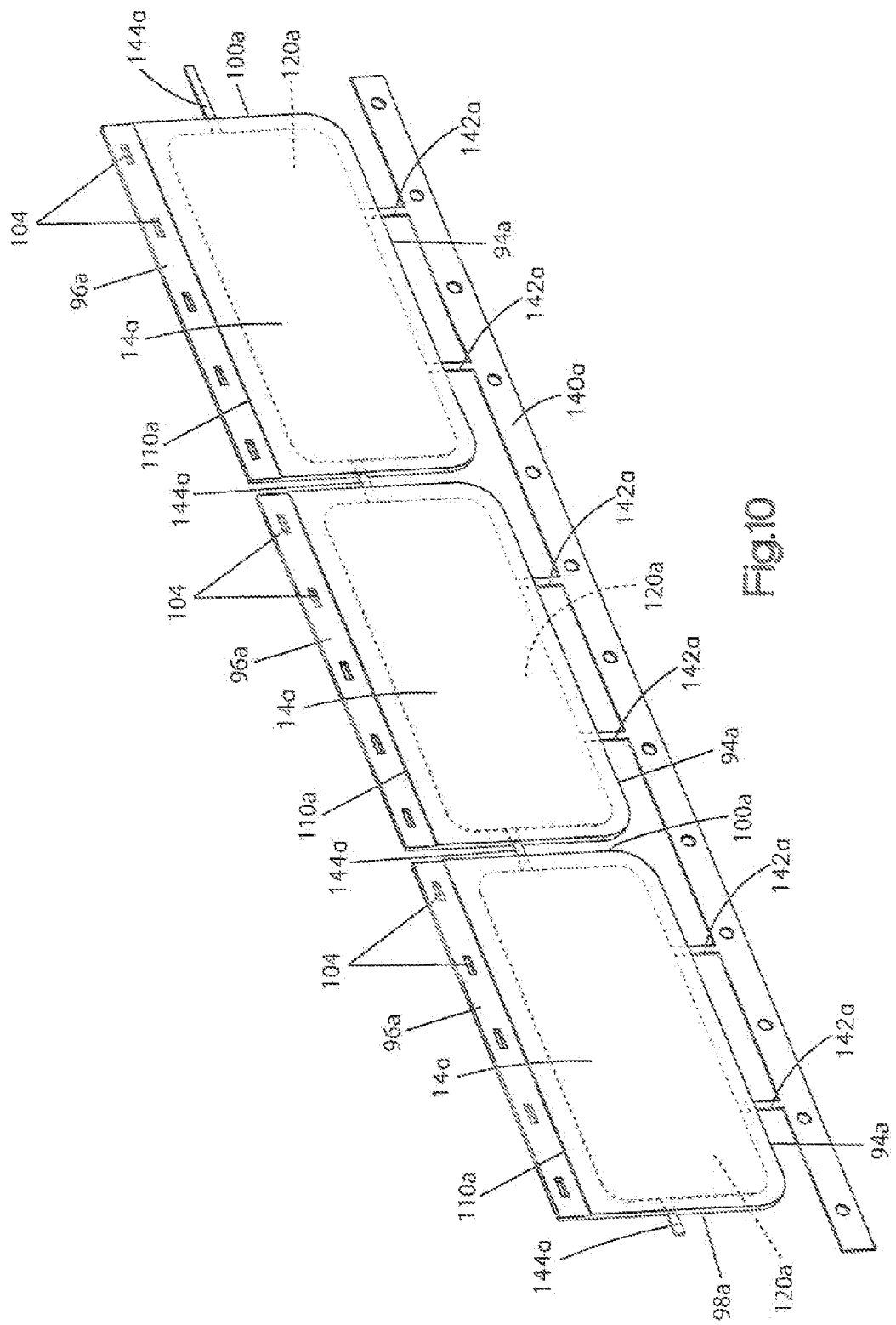

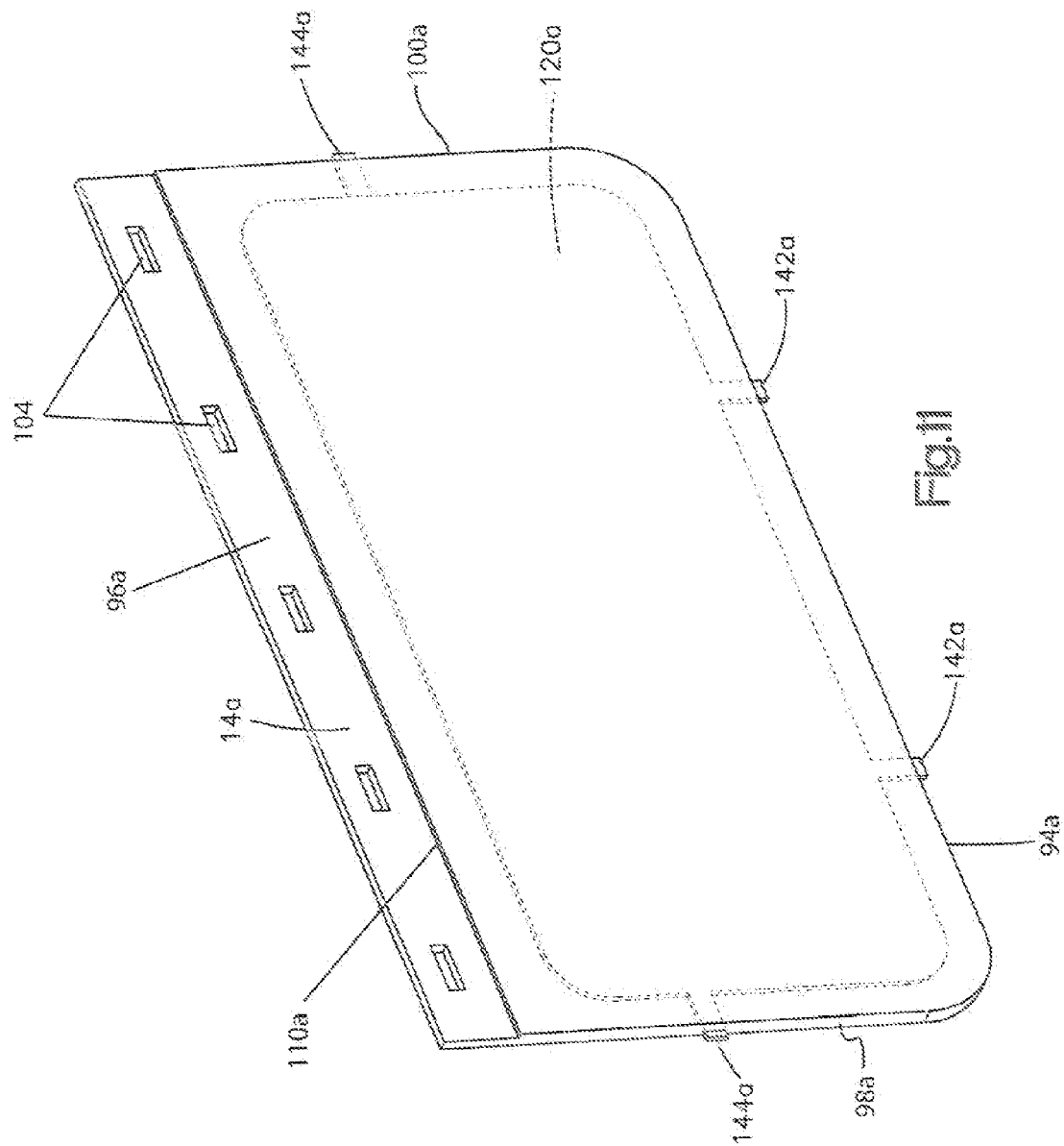

US 9,366,348 B2

PRESSURE RELIEF VALVE

RELATED APPLICATION

This application claims priority from U.S. Provisional Patent Application Ser. No. 61/101,451, fled Sep. 30, 2008, the subject matter of which is incorporated herein by reference in its entirety.

TECHNICAL FIELD

The present invention relates to air vents in vehicles and more particularly, relates to a pressure relief valve for the venting of air pressure out of a motor vehicle and to a method for making the pressure relief valve.

BACKGROUND OF THE INVENTION

Pressure relief valves are widely used in motor vehicles to relieve air pressure surges or peaks in the passenger compartment which result, for example, when the doors are slammed shut. The valves generally comprise a simple rigid frame or housing which mounts in an aperture in a vehicle body panel. A valve element in the form of a flap is connected to the frame to overlie the aperture in the vehicle body panel. The valve element opens relative to the frame to uncover the aperture to relieve air pressure surges.

SUMMARY OF THE INVENTION

The present invention relates to a pressure relief valve that includes a housing that has a side wall for defining an air flow passage. A valve element has a closed condition that prevents air flow through the air flow passage and an open condition that permits air flow through the air flow passage. A first insert is connected to the valve element. A second insert is connected to the side wall. The first insert and the second insert cooperate using magnetic forces to urge the valve element to the closed condition. At least one of the first insert and the second insert is positioned within the air flow passage.

The present invention further relates to a method of forming a pressure relief valve that includes providing a housing that has a side wall or defining an air flow passage and a valve element that is connected to a first insert. A second insert is connected to the side wall, the first insert and the second insert cooperating using magnetic forces to urge the valve element to a closed condition preventing air flow through the air flow passage. At least on of the first insert and the second insert is positioned within the air flow passage.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 3 is a rear view of the pressure relief valve of FIG. 1;

FIG. 4 is a front view of a portion of the pressure relief valve of FIG. 1 during a step of forming the pressure relief valve;

FIG. 5 is a front view of a portion of the pressure relief valve of FIG. 1 during another step of forming the pressure relief valve;

FIG. 6 is a front view of a portion of the pressure relief valve of FIG. 1 during yet another step of forming the pressure relief valve;

FIG. 7 is a front view of a pressure relief valve in accordance with another embodiment of the present invention;

FIG. 8 is a rear view of the pressure relief valve of FIG. 7;

FIG. 9 is a from view of a portion of the pressure relief valve of FIG. 7 during a step of forming the pressure relief valve;

FIG. 10 is a front view of a portion of the pressure relief valve of FIG. 1 during another step of manufacturing; and FIG. 11 is a front view of a valve element of the pressure relief valve of FIG. 7.

DETAILED DESCRIPTION OF THE INVENTION

Figure 1:
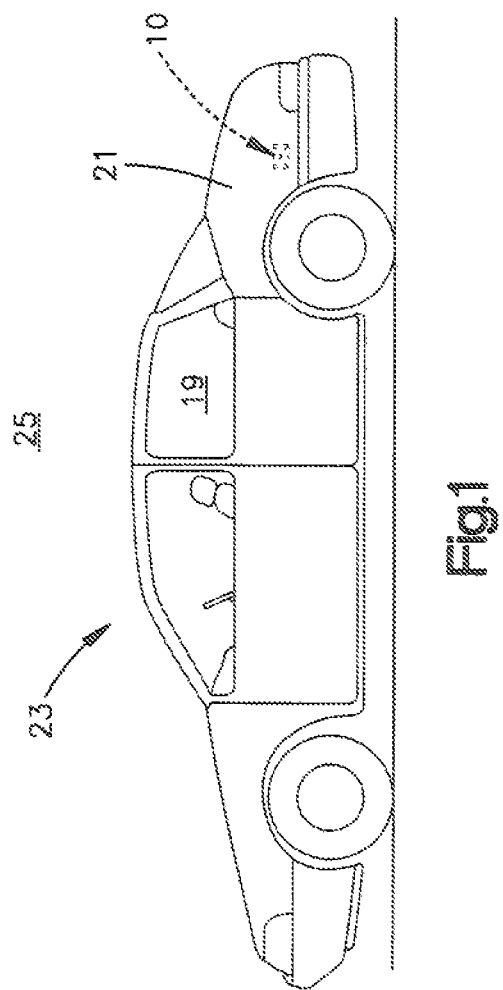
FIG. 1 is a schematic illustration of a pressure relief valve in accordance with an embodiment of the present invention.
Figure 2:
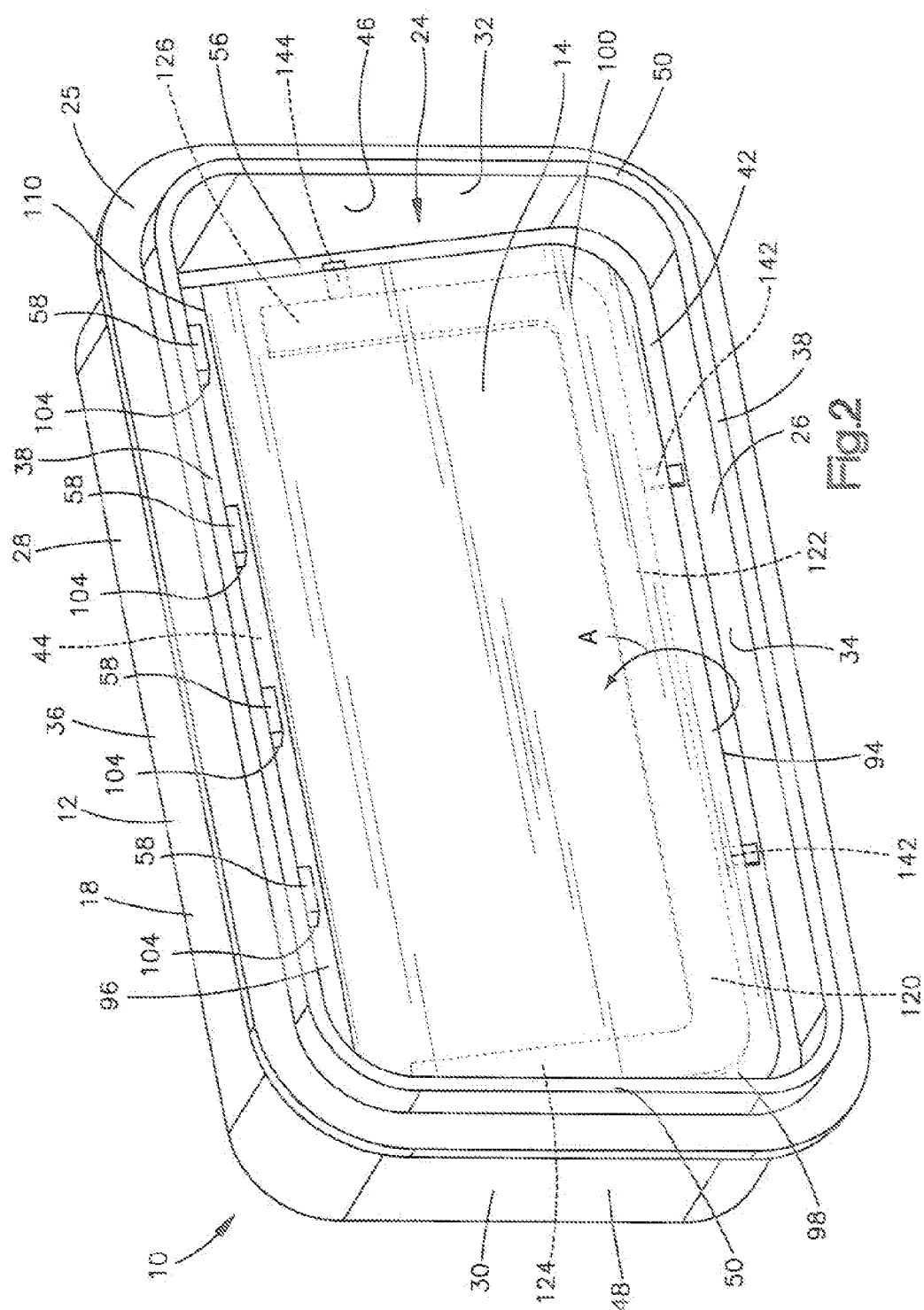
FIG. 2 is a front view of the pressure relief valve of FIG. 1.

The present invention relates to air vents in vehicles and more particularly, relates to a pressure relief valve for the venting of air pressure out of a motor vehicle and to a method for making the pressure relief valve. A first embodiment of a pressure relief valve 10 constructed in accordance with the present invention is illustrated in FIGS. 1-3. The pressure relief valve 10 may be located in an aperture of a vertical body panel 21 of a motor vehicle 23. The pressure relief valve 10 may be fastened in the aperture to the body panel 21 in any desired manner, such as by a latch connection (not shown). The pressure relief valve 10 can also have alternative locations in the vehicle 23. For instance, the pressure relief valve 10 may be located in the area of the vehicle trunk which is connected to the passenger compartment 19.

The pressure relief valve 10 (FIG. 2) includes a housing 12 and a valve element or flap 14. The housing 12 includes an axially extending side wall 18 that extends around the perimeter of the housing and defines at least one central air flow passage 24. The central air flow passage 24 connects the passenger compartment 19 within the vehicle 23 to the atmosphere 25 outside the vehicle and establishes an equalized air pressure between the passenger compartment and the outside atmosphere. While the housing 12 is depicted as having a generally rectangular shape, it should be understood that the housing can have any geometry including, for example, square, triangular, polygonal, elliptical, and circular, etc. The housing 12 may be formed from any rigid material, such as metal, plastic or combinations thereof.

A flange 25 for engaging the vehicle body panel 21 also extends around the perimeter of the housing 12. A flexible seal (not shown) may extend from the flange 25 and peripherally around the housing 12. The seal is configured to help seal the connection between the pressure rebel valve 10 and the body panel 21 of the vehicle 23 against air, water, dust, and foreign matter from passing through the aperture except through the central air flow passage 2. When the pressure relief valve 10 is inserted into the aperture in the body panel 21, the flange 25 and the seal are forced into contact with the body panel at an area peripherally adjacent the side wall 18 of the housing 12. In the inserted position, the seal is forced to spread outwardly and substantially parallel relative to the body panel 21.

The side wall 18 comprises four side wall sections connected together. First and second longer side wall sections 26, 28 are located parallel to each other. Each of the first and second longer side wall sections 26, 28 has inner and outer surfaces 34, 36 spaced apart from each other (FIG. 3). Each of the first and second longer side wall sections 26, 28 also has axially spaced apart top and bottom surfaces 38, 40. The top and bottom surfaces 38, 40 interconnect the inner and outer surfaces 34, 36 of each first and second longer side wall section 26, 28.

The inner surface 34 of the first longer side wall section 26 includes a flange 42 that extends inwardly into the central air flow passage 24 from a location approximating the top of the inner surface. The inner surface 34 of the second longer side wall section 28 has a flange 44 that extends inwardly into the central air flow passage 24 from a location near the bottom of the inner surface. The flanges 42, 44 on the inner surfaces 34 of the first and second longer side wall sections 26, 28 are located at different heights along the side wall 18, i.e., spaced at different distances from the top and bottom suffices 38, 40, with respect to each other.

First and second shorter side wall sections 30, 32 are located parallel to each other and generally perpendicular to the first and second longer side wall sections 26, 28. Each of the first and second shorter side wall sections 30, 32 has inner and outer surfaces 46, 48 spaced apart front each other and axially spaced apart top and bottom surfaces 50, 52 (FIG. 3). The top and bottom surfaces 50, 52 interconnect the inner and outer surfaces 45, 48 of each first and second shorter side wall section 30, 32. The inner surface 46 of the first shorter side wall section 30 includes a flange 54 that extends inwardly into the central air flow passage 24. The flange 54 further extends diagonally along the inner surface 46 of the first shorter side wall section 30 from a top portion to a bottom portion of the first shorter side wall section to connect the flanges 42 and 44 or the first and second longer side walls 26 and 28.

The inner surface 46 of the second shorter side wall 32 has a flange 56 extending inwardly into the central air flow passage 24. The flange 56 further extends diagonally along the inner surface 46 of the second shorter side wall 32 from a top portion to a bottom portion of the second shorter side wall to connect the flanges 42 and 44 on the first and second longer side wall sections 26 and 28. Due to this configuration, the diagonal flanges 54, 56 are mirror images of one another. Collectively, the flanges 42, 44, 54, 56 extend around the entire side wall 18 within the central air flow passage 24.

The flange 44 on the second longer side wall section 28 includes a plurality of projections 58 that extend toward the top surface 38 of the second longer side wall section. Although the flange 44 is depicted as having five projections 58, the flange may alternatively include any desired number of projections. The projections 58 are configured to connect the valve element or flap 14 to the flange 44.

The valve element or flap 14 has a generally rectangular shape. It should also be understood that the flap 14 can have any shape, such as triangular or square. The valve element 14 may be formed from any material that provides a seal that prevents air, water, dust, and foreign matter from passing through the central air flow passage 24 and into the passenger compartment 19 when the valve element is in a closed condition obstructing the entire central air flow passage. The valve element 14 may, for example, be formed from a material that is non-magnetic such as an elastomeric material.

The valve element 14 has spaced apart first and second longer peripheral edges 94, 96 that extend parallel to one another and first and second spaced apart shorter peripheral edges 98, 100 that extend parallel to one another. The valve element 14 further includes a plurality of openings 104 adjacent to the second longer peripheral edge 96. The size, shape, and placement of the openings 104 corresponds to the size, shape, and placement of the projections 58 on the flange 44.

A hinge 110 extends generally parallel to the first and second longer peripheral edges 94, 96 and between the first and second shorter peripheral edges 98, 100 adjacent to the first longer peripheral edge. The hinge 110 may be a thin portion of the valve element 14 that is integrally molded into the valve element. The hinge 110 may, for example, constitute a living hinge in the valve element 14.

An insert 120 is connected to the valve element 14 for providing rigidity to the valve element to help prevent plastic deformation of the valve element during operation of the pressure relief valve 10. In other words, the valve element 14 is formed from a material that is softer than the material of insert 120. The insert 120 may be made of any metallic material, such as low carbon steel. Although the insert 120 is illustrated as having a U-shaped construction, the insert may have any desired shape that adds rigidity to the valve element 14.

The insert 120 is connected to the valve element 14 by insert molding the valve element over the insert. Alternatively, the insert 120 may be secured to an outer surface of the valve element 14 or otherwise connected to the valve element in any desired manner, such as adhering or fastening the insert to the valve element. When the valve element 14 is molded over the insert 120, the insert is substantially covered by the material of the valve element.

The insert 120 includes a bottom portion 122 and a pair of arms 124 and 126. The bottom portion 122 extends adjacent to and generally parallel to the first longer peripheral edge 94 of the valve element 14. The first and second arms 124 and 126 extend from the bottom portion 122 and generally parallel to each other. The first and second arms 124 and 126 also extend adjacent to and generally parallel to the first and second shorter peripheral edges 98, 100, respectively, of the valve element 14. Although the arms 124 and 126 are illustrated as being integrally formed with the bottom portion 122, it is contemplated that one or both of the arms may be formed as separate pieces and spaced from the bottom portion.

To secure the valve element 14 and the insert 120 to the housing 12, the projections 58 on the flange 44 are extended through the openings 104 in the valve element. In particular, each of the projections 58 may snap into one of the openings 104 to connect the valve element 14 to the housing 12. Alternatively, a retainer bar (not shown) may snap onto the projections 58 and clamp the second longer peripheral edge 96 of the valve element 14 to the flange 44. In any case, the valve element 14 is connected to the side wall 18 of the housing 12 in a hinged configuration such that the valve element is pivotable relative to the housing and, thus, pivotable relative to the central air flow passage 24.

The valve element 14 is movable relative to the housing 12 in the direction indicated generally by arrow A (FIG. 2) between a closed condition overlying and completely obstructing the central air flow passage 24 and an open condition that permits air flow through the central air flow passage in only one direction. In the closed condition, the first and second shorter side edges 98, 100 of the valve element 14 are seated on the flanges 54, 56 and the first longer peripheral edge 96 is seated on the flange 42 of the first longer side wall section 26. As noted, the flanges 42, 44 extend in a linear direction horizontally along the first and second longer side walls 26, 28. Since the flanges 54, 56 extend in a diagonal direction relative to the top and bottom surfaces 50, 52 of the first and second shorter side walls sections 30, 32, the valve element 14 also extends diagonally relative to the top and bottom surfaces when the valve element is in the closed condition and seated on the flanges 42, 44 and 54, 56.

In the open condition, the first and second shorter side edges 98, 100 of the valve element 14 are spaced from the flanges 54, 56 and the first longer peripheral edge 96 is spaced from the flange 42 of the first longer side wall section 26. The valve element 14 can only open in a direction outward of the housing 12 (as viewed in FIG. 2) and cannot open in a direction into the housing because the flanges 42, 44, 54, 56 block movement of the valve element inward.

An insert 130 far urging the valve element 14 towards the closed condition is connected to the first longer side wall section 26 of the housing 12. The insert may, for example, constitute a permanent magnet 130. The magnet 130 may snap into an opening 132 of a housing portion 134 extending from the first longer side wall 26 of the housing 12. The housing portion 134 may be formed as part of the first longer side wall 26 or may be a separate piece connected to the first longer side wall via fasteners or the like. The housing portion 134 may extend into the central air flow passage 24. Alternatively, the housing portion 134 may be omitted and the magnet 130 may be connected to the housing 12 in any desired manner such as by fasteners, adhesive or the like. When the valve element 14 is connected to the housing 12, the magnet 130 is located adjacent to the bottom portion 122 of the insert 120 and the first longer peripheral edge 94 of the valve element 14.

Alternatively or additionally, a magnet ma be connected to either or both shorter side wall sections 30, 32 adjacent to the arms 124, 126 of the insert and the first and second shorter peripheral edges 98, 100 of the valve element 14. In any case, the magnet along any side wall may constitute a single magnet or several spaced apart magnets.

The magnet 130 helps to hold the valve element 14 in the closed condition by applying a magnetic force to the insert 120. In particular, the magnet 130 may engage the first longer peripheral edge 94 of the valve element 14 adjacent the bottom portion 122 of the insert 120 when the valve element is in the closed condition due to the magnetic forces between the magnet and the metallic insert within the valve element. The valve element 14 engages the housing portion 134 when the valve element is in the closed condition. The attraction between the magnet 130 and the metallic insert 120 within the valve element 14 helps to maintain the valve element in the closed condition. The magnitude of the magnetic forces between the insert 120 and the magnet 130 can be tailored to meet desired performance criterion. In particular, the material of the insert 120 and the material of the magnet 130 can be chosen to be more or less magnetic.

Although the pressure relief valve 10 is illustrated with a permanent magnet 130 connected to the side wall 26 and a metallic insert 120 connected to the valve element 14, those having ordinary skill will contemplate that other configurations can be used. For example, the permanent magnet 130 may be connected to the valve element 14 and the metallic insert 120 may be connected to the side wall 26 (not shown). In any configuration, the permanent magnet 130 and the metallic insert 120 cooperate using magnetic forces to urge the valve element 14 to the closed condition.

The pressure relief valve 10 of the present invention is operable from the closed condition to the open condition in response to differential air pressure between the passenger compartment 19 of the vehicle 23 and atmosphere 25 outside of the vehicle. The pressure relief valve 10 is mounted vertically in the body panel of the vehicle. In this orientation, the hinge 110 is located near the top (as viewed in FIG. 2) when mounted to the body panel. By placing the hinge 110 near the top of the pressure relief valve 10, gravitational forces act to cause the valve element 14 to extend downward and engage the flanges 42, 54, 56 to place the valve element in the closed condition. Due to the diagonal slope of the flanges 54, 56, the valve element 14 likewise extends in a diagonally downward direction when in the closed condition.

Magnetic and gravitational forces cooperate to maintain the valve element 14 in the closed condition. In particular, gravity acts on the valve element 14 to help keep the valve element in the closed condition as long as the difference between the air pressure, within the passenger compartment 19 of the vehicle 23 and atmospheric pressure 25 is below a predetermined value. Since the bottom portion 122 of the metallic insert 120 is positioned adjacent the magnet 130 when the valve element 14 is in the closed condition, the magnet 130 supplies a magnetic three to the magnetic insert 120 within the valve element. The magnetic three helps to maintain the valve element 14 in the closed condition as long as the difference between the air pressure within the passenger compartment 19 of the vehicle 23 and atmospheric pressure is below the predetermined value.

When atmospheric pressure is above the pressure within the passenger compartment 19 of the vehicle 23, the atmospheric pressure, gravity, and the magnet 130 act against the valve element 14 to maintain the valve element in the closed condition. In the closed condition, the edges 96, 98, 100 of the valve element 14 are seated against the flanges 42, 54, and 56, which prevents inward movement of the valve element relative to the housing. As a result, air flow, water, dust, and foreign matter from the atmosphere 25 are prevented from passing through the central air flow passage 24 and into the passenger compartment 19 of the vehicle 23.

When the air pressure within the passenger compartment 19 is greater than atmospheric pressure by the predetermined level, i.e., a level sufficient to overcome the magnetic and gravitational forces maintaining the valve element 14 in the closed condition, the valve element rotates about the hinge 110 in the direction A outward and away from the flanges 42, 54, and 56. Rotation of the valve element 14 in this manner causes the valve element to unseat from the flanges 42, 54, and 56, thereby spacing the valve element from the flanges and placing the valve element in the open condition. The open condition of the valve element 14 enables air flow through the central air flow passage 24 from the passenger compartment 19 to atmosphere 25. When the differential air pressure between the passenger compartment 19 of the vehicle 23 and atmosphere 25 thereafter falls below the predetermined level, the gravitational and magnetic forces acting upon the metallic insert 120 within the valve element 14 cause the valve element to rotate about the hinge 110 in a direction opposite to arrow A inward and back to the closed condition preventing air flow through the central air flow passage 24.

The pressure relief valve 10 of the present invention is advantageous over existing pressure relief valves for several reasons. First, typical pressure relief valves use weighted valve elements to increase the gravitational forces acting on the valve element, thereby increasing the weight of the valve element. The use of magnetic forces, however, to help maintain the valve element 14 in the closed condition allows the valve element to remain lightweight. The lightweight construction of the valve element 14 results in a pressure relief valve 10 that responds more rapidly to changing air pressure differentials. Furthermore, the vertically angled orientation of the valve element 14 relative to the side wall 18 of the housing 12 due to the diagonally extending flanges 54, 56 ensures that water will drain away from the pressure relief valve 10 and to the exterior of the vehicle 23 rather than into the passenger compartment 21. Moreover, the simplified interconnection between the valve element 14, the insert 120, the housing 12, and the magnet 130 reduces the number of parts required and the cost of manufacturing.

A method of forming the pressure relief valve 10 of the present invention is illustrated in FIGS. 4-6. In particular, the valve element 14 for the pressure relief valve 10 is formed by stamping U-shaped inserts 120 out of a sheet 140 of metal (FIG. 4). As noted, each insert 120 includes a bottom portion 122 and a pair of substantially parallel arms 124 and 126 that extend from the bottom portion. The bottom portion 122 of each insert 120 is connected to the sheet 140 by one or more tabs 142. The arms 124 and 126 of each insert 120 are connected to adjacent inserts 120 by one or more tabs 144. Since the inserts 120 are stamped out of a sheet 140, the inserts can be easily configured to have any desirable shape depending on the particular application of the pressure relief valve 10 and/or the configuration of the magnet 130 or magnets secured to the side wall 18 of the housing 12.

After the inserts 120 are stamped, the inserts are moved into a mold, such as a vertical mold. The material for the valve elements 14 is then injected into the mold to form the valve elements around the inserts 120 (FIGS. 5-6). One formed, one or more portions of the insert 120 may be exposed, although it may be desirable to completely surround each insert with the material of each valve element 14 (not shown). The tabs 142 and 144 interconnecting the inserts 120 are then cut to separate the valve elements 14 from one another. The valve element 14 having the metallic insert 120 therein is then connected to the housing 12 in the manner described to form the pressure relief valve 10.

A pressure relief valve 10a in accordance with another embodiment of the present invention is illustrated in FIGS. 7-11. The pressure relief valve 10a is similar to the pressure relief valve 10 except that the pressure relief valve 10a includes an insert 120a having a rectangular shape. Structure, illustrated in FIGS. 7-11 that is substantially similar to that exhibited in FIGS. 1-6 retains the same reference numeral, whereas structure in FIGS. 7-11 that is different includes the suffix "a".

Similar to the valve element 14, the valve element 14a is formed by stamping rectangular inserts 120a out of a sheet 140a. The rectangular insert 120a has first and second longer peripheral edges 150, 152 and first and second shorter peripheral edges 154 and 156 interconnecting the first and second longer peripheral edges. The first longer peripheral edges 150 of each insert 120a are connected to the sheet 140a by one or more tabs 142a. The shorter peripheral edges 154, 156 of each insert 120a are connected to adjacent inserts 120a by one or more tabs 144a.

After the inserts 120a are stamped, the inserts are moved into a mold, such as a vertical mold. The material for the valve elements 14a is then injected into the mold to form the valve elements around each insert 120a (FIGS. 9-11). Alternatively, the insert 120a may be connected to the valve element 14a in any desired manner, such as by adhering or fastening the insert to an outer surface of the valve element (not shown). When the valve element 14a is formed with the insert 120a, the first and second longer peripheral edges 150, 152 extend adjacent and generally parallel to the first and second longer peripheral edges 94a, 96a of the valve element. Likewise, the first and second shorter peripheral edges 154 and 156 of the insert 120a extend adjacent and generally parallel to the first and second shorter peripheral edges 98a, 100a, of the valve element 14a.

The insert 120a may be substantially covered by the material of the valve element 14a or the valve element may completely cover the insert (not shown). The tabs 142a and 144a interconnecting the inserts 120a are then cut to separate the valve elements 14a from one another (FIG. 11). The valve element 14a having the metallic insert 120a therein is the connected to the housing 12a in the manner described to form the pressure relief valve 10a.

Although a U-shaped insert 120 and a rectangular insert 120a have been described, those having ordinary skill will contemplate that the insert can have any shape adapted to releasably cooperate with one or more magnets connected to the side wall sections 26, 28, 30, 32 of the housing 12.

From the above description of the invention, those skilled in the art will perceive improvements, changes and modifications. For example, instead of one flap valve element, multiple flap valve elements can be connected with the housing in multiple through holes to form the pressure relief valve 10. Such improvements, changes and modifications within the skill of the art are intended to be covered by the appended claims.

Having described the invention, we claim the following:

1. A method of forming a pressure relief valve comprising: providing a housing having a side wall with an inner surface that defines an air flow passage; stamping a plurality of first inserts out of a metal sheet, the plurality of first inserts being connected to one another after stamping; connecting a valve element to one of the first inserts; and connecting a second insert to the side wall, the valve element having an inner surface and an outer surface, the one of the first inserts and the second insert cooperating using magnetic forces and gravity to urge the valve element to a closed condition preventing air flow through the air flow passage, the inner surface of the valve element engaging the second insert when the valve element is in the closed condition.

2. The method recited in claim 1, wherein the step of connecting a second insert to the side wall includes connecting a permanent magnet to the side wall and within the air flow passage.

3. The method recited in claim 1, wherein the step of connecting a valve element to one of the first inserts includes overmolding a valve element onto a U-shaped metallic insert.

4. The method recited in claim 3, including substantially covering the metallic insert with the material of the valve element.

5. The method recited in claim 1 further comprising the step of overmolding a plurality of valve elements over the plurality of first inserts.

6. The method recited in claim 5 further comprising the step of separating each of the plurality of valve elements from one another after overmolding the plurality of valve elements.

7. The method recited in claim 1, wherein the step of connecting a valve element to one of the first inserts includes overmolding a valve element onto a permanent magnet.

* * * * *